(12) United States Patent
Mildner et al.

(10) Patent No.: US 9,598,115 B2
(45) Date of Patent: Mar. 21, 2017

(54) REAR FENDER MODULE

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/522,423

(22) Filed: Oct. 23, 2014

(65) Prior Publication Data

US 2015/0108792 A1 Apr. 23, 2015

(30) Foreign Application Priority Data

Oct. 23, 2013 (DE) ................ 10 2013 017 729

(51) Int. Cl.

| | | |
|---|---|---|
| *B60K 15/00* | (2006.01) | |
| *B62D 25/18* | (2006.01) | |
| *B60K 15/05* | (2006.01) | |
| *B62D 25/02* | (2006.01) | |
| *B62D 25/16* | (2006.01) | |
| *B62D 27/06* | (2006.01) | |
| *B60K 15/04* | (2006.01) | |

(52) U.S. Cl.
CPC .............. *B62D 25/18* (2013.01); *B60K 15/04* (2013.01); *B60K 15/05* (2013.01); *B62D 25/02* (2013.01); *B62D 25/16* (2013.01); *B62D 25/163* (2013.01); *B62D 27/06* (2013.01); *B60K 2015/0474* (2013.01); *B60K 2015/0553* (2013.01)

(58) Field of Classification Search
CPC ... B62D 5/18; B62D 5/02; B62D 5/16; B62D 5/1632; B62D 27/06; B62D 25/18; B62D 25/02; B62D 25/16; B62D 25/1632; B62D 25/163; B60K 15/05; B60K 2015/0474; B60K 2015/0553
USPC .................................................. 296/194, 198
See application file for complete search history.

(56) References Cited

U.S. PATENT DOCUMENTS

| | | | |
|---|---|---|---|
| 2,352,421 A | | 6/1944 | Wohlfield |
| 2,417,324 A | * | 3/1947 | Rivard .................. B60K 15/04 280/834 |
| 2,467,001 A | | 4/1949 | Allen |
| 2,691,545 A | | 10/1954 | Lyon |
| 3,093,392 A | * | 6/1963 | Barenyi ................ B62D 25/16 280/847 |

(Continued)

FOREIGN PATENT DOCUMENTS

| | | |
|---|---|---|
| DE | 976990 C | 10/1964 |
| DE | 102009011895 A1 | 10/2009 |

(Continued)

OTHER PUBLICATIONS

Great Britain Patent Office, Great Britain Search Report for Great Britain Application No. 1418251.3, dated Apr. 10, 2015.

*Primary Examiner* — Joseph D Pape
*Assistant Examiner* — Dana Ivey (57) ABSTRACT

The present disclosure relates to a rear fender module for arrangement on a side panel of a motor vehicle body. The rear fender module includes a fender shell and at least one add-on part arranged thereon. The fender shell has at least two fastening sites for detachable fastening on the side panel.

15 Claims, 8 Drawing Sheets

(56) References Cited

U.S. PATENT DOCUMENTS

| | | | | |
|---|---|---|---|---|
| 4,174,850 | A | * | 11/1979 | Hart ................ B62D 25/18 24/486 |
| 4,215,873 | A | * | 8/1980 | Price ................ B62D 25/161 280/848 |
| 4,447,067 | A | | 5/1984 | Yamashita |
| 5,253,920 | A | * | 10/1993 | Eldridge ............ B60K 15/0406 220/86.2 |
| 5,460,411 | A | | 10/1995 | Becker |
| 5,613,710 | A | | 3/1997 | Waner |
| 6,354,625 | B1 | * | 3/2002 | Lambertus ........... B62D 25/168 280/154 |
| 8,118,329 | B2 | * | 2/2012 | Braga ................ B60R 13/04 280/848 |
| 2011/0304129 | A1 | | 12/2011 | Owens |

FOREIGN PATENT DOCUMENTS

| | | |
|---|---|---|
| DE | 102009053935 A1 | 5/2011 |
| GB | 505160 A | 5/1939 |
| JP | S62141581 U | 9/1987 |
| JP | S646182 U | 1/1989 |
| WO | 9818670 A1 | 5/1998 |

\* cited by examiner

REAR FENDER MODULE

CROSS REFERENCE TO RELATED APPLICATION

This application claims priority to German Patent Application No. 102013017729.4 filed Oct. 23, 2013, which is incorporated herein by reference in its entirety.

TECHNICAL FIELD

The technical field relates to a rear fender module for arrangement on a side panel of a motor vehicle body.

BACKGROUND

The rear fender of a self-supporting body of a motor vehicle, configured for example as a passenger vehicle, is typically integrated into a side panel element extending from the vehicle floor up to the vehicle roof Repairs to a damaged rear fender are therefore comparatively complex and cost-intensive.

A motor vehicle body with a side panel is disclosed in DE 10 2009 053 935 A1. In order to facilitate the assembly of the motor vehicle, the side panel is provided here as a module. The module includes the A column, the B column and the C column, a sill inner part and a front door and a rear door. These parts of the side panel module are preassembled separately and are subsequently connected with a body shell structure. The side panel module, together with the body shell structure, runs through the paint section and if applicable subsequent heat treatment steps. After being painted together, the side panel module is then released again in its entirety from the body shell structure. A front fender and a rear fender can be integrated here into the side panel module.

As such there is a need to provide a rear fender structure which is able to be repaired comparatively simply and with as few costs as possible in the case of damage. Along with this, the fender structure will enable a more favorable insurance classification of the motor vehicle. Furthermore, the rear fender structure will facilitate an assembly of the motor vehicle or respectively of the motor vehicle body which is particularly simple and economical in terms of manufacture.

SUMMARY

A rear fender module provided in this respect is for arrangement on a side panel, in particular so as to be able to be arranged on a rear side panel of a motor vehicle body, in particular of a passenger vehicle. The rear fender module is constructed accordingly for arrangement on the side panel. The rear fender module has a fender shell and at least one add-on part arranged thereon. The fender shell is additionally provided with at least two fastening sites, in order to fasten the fender shell, and therefore the entire rear fender module, detachably on the side panel of the motor vehicle body.

In a final assembly configuration, in which the rear fender module is arranged on the side panel of the body, the fender shell forms an outer skin at least partially surrounding a wheel arch of the body, or an exterior lining of the vehicle body. The rear fender module is typically arranged beneath and adjoining a belt line of the motor vehicle body, running approximately horizontally, which typically coincides with a lower edge of a rear side window of the motor vehicle body. As the lower edge of the typically fixed rear side window in any case is to be covered by a cover or trim, in that region a separate fender shell or respectively a fender module can be arranged, maintaining a predetermined clearance to the window situated thereabove.

The gap to adjoining body components, inevitably occurring through the module-type configuration of the fender, can be concealed by means of the cover at least upwards, viewed in the vertical direction (z) of the vehicle. Downwards, the fender shell is typically delimited by a wheel house edge, running in the manner of a curve, whilst adjoining towards the rear, opposed to the direction of travel, are a rear light module and, lying therebeneath, a bumper lining.

Toward the front, i.e. viewed in the direction of travel, the fender shell is typically delimited by a door cut-out of the motor vehicle body. A front end section of the fender shell coincides in this respect with a column structure, for instance with a B or C column of the motor vehicle body, aligned substantially in the vertical direction (z) of the vehicle.

By the fender shell having at least two fastening sites, spaced apart from one another, the fender shell can be connected separately and detachably with the side panel of the motor vehicle body by at least one add-on part, arranged thereon, in a separate working step, for instance at the end of the assembly of the body. Through the fact that the add-on part is able to be arranged on the fender shell, the fender module can be pre-assembled with an add-on part already before mounting on the side panel. The respective add-on part can be arranged at least partially or exclusively via its fastening on the fender shell via the side panel of the motor vehicle body and therefore indirectly on bearing components of the motor vehicle body.

With regard to manufacturing and assembly technique, it can be achieved hereby that the rear or back fender is completed to form a fender module parallel to the main production line of the motor vehicle body by arrangement of several different add-on parts and in this respect is finally mounted on the finished painted motor vehicle body as a pre-assembled or respectively prefabricated structural unit. In this way, the assembly time and also the final assembly expenditure of the motor vehicle body can be reduced.

It is also conceivable to have the prefabricated fender module, which is provided here, manufactured by a motor vehicle supplier, so that a prefabricated rear fender module is merely to be provided for the final assembly of the motor vehicle, so that the number of components which are to be mounted during the final assembly of the motor vehicle can be reduced.

According to a further embodiment, the fender shell has an upper fastening edge, with at least one fastening site and projecting inwards in the manner of a flange in the transverse direction (y) of the vehicle, running in the longitudinal direction (x) of the vehicle in relation to the installation position in the motor vehicle. By means of the inwardly projecting upper fastening edge and the fastening site constructed there, the fender shell can be fastened on the side panel of the motor vehicle body. Typically, the side panel has, for this, a mount projecting outwards in a corresponding manner to the upper fastening edge, with which mount the fastening edge is able to be detachably connected.

It is conceivable here to fasten the upper fastening edge of the fender shell detachably to the mount on the side panel side by means of one or more threaded connections. After a mounting of the fender module on the side panel, a gap inevitably forming between the upper fastening edge of the fender shell and the side panel contour adjoining upwards hereto can be concealed by means of a cover or a trim. The upper fastening edge, projecting inwards in the manner of a flange, in addition gives the fender shell, which is approximately flat in construction, an increased stability against deformations.

Through the construction of the flange-like upper fastening edge, the inherent rigidity and stability of the fender shell can be increased. In some circumstances, it is even conceivable to reduce the material thickness or respectively the sheet metal thickness of the fender shell in order to reduce the motor vehicle weight.

According to a further embodiment, the rear fender module has, in addition, a rear connection structure projecting radially inwards in the transverse direction of the vehicle, on a rear end section of the fender shell. The rear connection structure is also provided with at least one fastening site, by means of which the fender module is able to be detachably fastened to a rear reinforcement profile of the motor vehicle body.

Provision is made in particular here that the fender module rests via the inwardly projecting protrusion, for instance as an inwardly directed protrusion with respect to the fender shell, with the rear reinforcement profile extending at least partially from vertical direction (z) of the vehicle and transverse direction (y) of the vehicle, in the longitudinal direction (x) of the vehicle.

The rear reinforcement profile may be configured as a profile ring surrounding a rear opening of the motor vehicle, which structurally reinforces and stiffens the rear end of the motor vehicle body. Through the direct connection of the fender module to the rear reinforcement profile and via the inwardly projecting rear connection structure in this respect a particularly stable and durable fastening can be created for the fender module.

According to a further embodiment, the fender shell has in addition a front fastening edge lying at the front in relation to the direction of travel of the motor vehicle, running in the vertical direction (z) of the vehicle, projecting inwards in the manner of a flange in the transverse direction (y) of the vehicle, with at least one fastening site. By a front fastening edge of the fender shell also being directed inwards in the manner of a flange, not only can a further fastening site, not visible from the exterior, be provided for the fender shell, but also the fender shell can be further structurally reinforced and stiffened.

With fastening sites for the fender module being provided at the front fastening edge, at the upper fastening edge and also via the inwardly projecting rear connection structure, the fender module can be connected accordingly several times with the side panel or respectively with the rear reinforcement profile in a manner which is not visible when the doors and openings of the motor vehicle are closed.

According to a further embodiment, an add-on part, configured as a rear light module, is arranged on the rear connection structure of the fender module. In this respect, an entire rear light module can be preconfigured and merely arranged on the fender module and fastened thereon before being added or installed onto the motor vehicle body. With the later installation of the fender module into the motor vehicle body, therefore, a separate mounting of the rear light module on the motor vehicle body is superfluous. The rear light module can be connected in this respect solely via the rear fender module indirectly with supporting structural components of the motor vehicle body.

According to a further embodiment, a mount, provided with at least one detent element, for a bumper lining is constructed on a lower edge of the rear connection structure. This mount of the fender module is constructed for the arrangement and receiving of a lower end section of the bumper lining projecting forward in the direction of travel. By providing at least one detent element, the bumper lining can be connected in a form-fitting manner with the fender module during the assembly of the motor vehicle, without the aid of separate tools. In particular, when the connection structure of the fender module is constructed as a plastic injection molded part, such detent elements can be integrated into the rear connection structure almost with no costs involved and without further manufacturing steps.

According to a further embodiment, the fender shell is delimited below by a wheel house edge running in the manner of a curve, on the inner side of which an add-on part constructed as a fender insert is arranged. The fender insert can have an inner fender lining made of plastic, which can function in particular as protection against spray and corrosion. The wheel house edge of the fender shell typically extends forward and downward in a longitudinal beam- or side skirt region, whilst conversely, i.e. toward the rear, it adjoins the mount for the bumper lining.

Through the prefabricating fastening of the fender insert on the fender shell, a further assembly step can be eliminated in the final assembly of the motor vehicle. It is conceivable here that the fender insert is able to be fastened on the motor vehicle body solely via the fender shell. A separate and direct connection or fastening of the fender insert on the side panel or on a floor structure of the motor vehicle body can in this respect be advantageously dispensed with.

According to a further embodiment, the add-on part configured in the form of a wheel envelope curve and constructed as a fender insert is arranged with a side edge in a groove, projecting inwards in the transverse direction (y) of the vehicle, of the wheel house edge of the fender shell. The inwardly projecting groove of the wheel house edge of the fender shell and the side edge of the fender insert, lying on the outside in the transverse direction (y) of the vehicle and constructed in a corresponding manner herewith, have contours corresponding with one another, so that the side edge of the fender insert is able to be inserted for example in a force-fitting or clamping manner into the inwardly projecting groove of the wheel house edge of the fender shell.

In particular, the side edge of the fender insert, which is typically made from plastic, can be pressed or squeezed into the inwardly projecting and upwardly open groove of the wheel house edge of the fender shell. In addition to this, of course, an adhesive or form-fitting reciprocal connection of wheel house edge and side edge of the fender insert is also conceivable, for instance with the aid of individual detent elements.

According to a further embodiment, the add-on part, constructed in the form of a fender insert, facing the rear connection structure of the rear module, has at least one fastening element which is able to be connected with the rear connection structure. In this way, a section of the fender insert, spaced apart from the side edge and projecting inwards in the transverse direction (y) of the vehicle, can be securely connected with the connection structure of the fender module. The fastening element of the add-on part, configured as a fender insert, can have a fastening bracket provided with a through-opening, which bracket can be connected with the rear connection structure by means of a through opening, corresponding herewith, of the rear connection structure in an overlapping manner and with the use of a fastening element configured for example as a screw or as a detent element.

By means of the fastening element, facing the rear connection structure, the add-on part constructed as a fender insert can be fastened at least twice and therefore in a particularly stable and durable manner on the fender module.

In a further embodiment, the add-on part which is able to be fastened directly or indirectly on the fender shell is configured as a fuel filler tube. This add-on part is arranged here in a fuel inlet compartment integrated into the fender shell. The fuel inlet compartment can typically have a cup-like extension projecting inwards, in the transverse direction (y) of the vehicle, which depending on the configuration of the fender shell can be configured either in one piece with the fender shell or in a multi-part manner, i.e. as a component which is separate but which is to be connected to the fender shell.

The fuel filler tube can be fastened to the fuel inlet compartment in particular via a connection piece. Through this arrangement of the fuel filler tube on the rear fender module, a further simplification of assembly can be achieved for the final assembly of the motor vehicle.

In further development hereof, the add-on part configured as a fuel filler tube is fixed by means of a fixing element arranged on the add-on part constructed as a fender insert. In particular the fender insert can have a fixing element projecting upwards from an upper apex point of the wheel envelope curve, with which fixing element the fuel filler tube of the fuel inlet compartment is able to be fixed in a form-fitting or force-fitting manner. The fixing element can be configured as a clip surrounding the fuel filler tube or e.g. as a clamp at least partially surrounding the fuel filler tube.

In this way, two add-on parts of the fender module can also be interconnected, connected directly with one another, as it were bypassing the fender shell, whereby the stability and inherent rigidity of the fender module can be further increased. The add-on parts of fuel filler tube and fender insert, which are connected directly with one another by means of the fixing element, can in this respect stabilize each other reciprocally.

According to a further embodiment, the fender shell and/or the rear connection structure is constructed as a plastic or light metal sheet component. In particular, the configuration of the rear connection structure in the form of a plastic injection molded component enables a particularly efficient and cost-neutral integration of various fastening sections for add-on parts which are to be arranged on the fender module. In addition, it is conceivable to also construct the fender shell itself in the form of a plastic component. It is possible, in addition, to construct the fender shell and the rear connection structure in one piece or respectively as one component.

In so far as one of the components, the fender shell or the rear connection structure, is configured as a light metal sheet component, for instance as a magnesium or aluminum component, a hybrid or a pure light metal sheet type of construction can also be provided. With the embodiment of a pure, a fiber-reinforced and/or a plastic component provided with metal inserts, individual reinforcement structures, for instance in the form of reinforcement ribs, can be provided in or on the plastic component, in order to increase its mechanical stability.

According to a further aspect, finally, a motor vehicle body is provided with a side panel and with a previously described fender module fastened detachably thereon. The fender module arranged detachably on the motor vehicle body can be replaced comparatively simply and at low cost in the case of damage. Hereby, in addition, a more favorable insurance classification can result for the motor vehicle.

According to a further embodiment of the motor vehicle body, the side panel, adjoining a belt line running substantially in the longitudinal direction of the vehicle, typically below a fixed rear side window, has a mount projecting outwards in the transverse direction (y) of the vehicle for the formation of a form-fitting and detachable connection with an upper fastening edge of the fender shell of the fender module.

The mount of the side panel can cooperate here in particular with the inwardly projecting flange-like upper fastening edge of the fender shell. The upper fastening edge and the outwardly projecting mount of the side panel have here form-fitting means corresponding to one another, for instance in the form of elastic tongues engaging in recesses or depressions, by means of which tongues a durable and stable form-fitting fastening of the fender shell on the side panel, without tools for mounting and dismantling, is made possible.

In the light of the foregoing, finally, according to a further independent aspect, a motor vehicle is provided, which has at least one previously described fender module.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
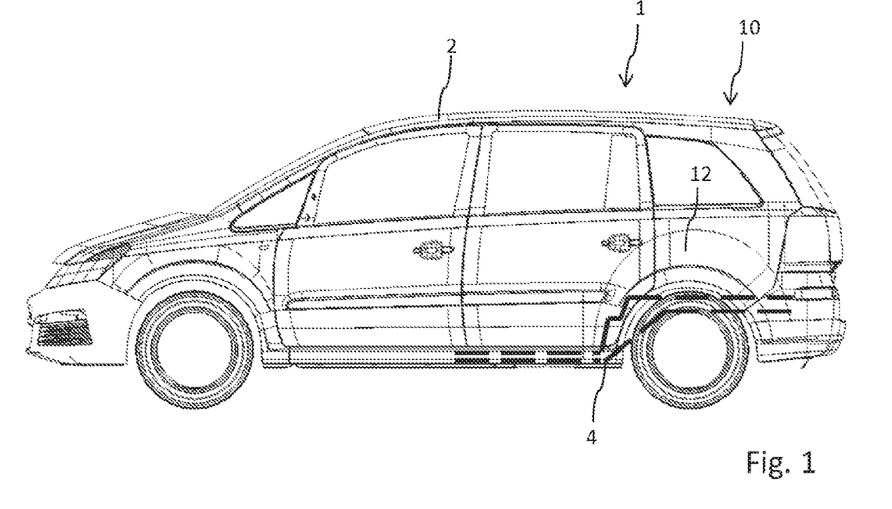
FIG. 1 is a representative side view of a motor vehicle.

The motor vehicle 1 illustrated in FIG. 1 has a self-supporting motor vehicle body 2. In a rear side panel region, i.e. on the rear side, a longitudinal beam 4 extends in the longitudinal direction (x) of the vehicle. Typically, two longitudinal beams 4, spaced apart from one another in the transverse direction (y) of the vehicle, are provided on the left and right on the vehicle, which are structurally connected with one another via at least one transverse beam and by their rear end sections via a bumper transverse beam 6 indicated in FIG. 2. A side panel assembly 10, shown in FIG. 2, extends laterally and substantially in the vertical direction (z) of the vehicle on the floor assembly formed by the longitudinal beams 4 and associated transverse beams and a floor pan, which is not shown explicitly here.

The side panel assembly 10 has a side panel 20, which extends downwards to the longitudinal beam 4 and upwards up to a roof railing or respectively to a vehicle roof 7. On the rear side, the side panel assembly 10 has a reinforcement profile 40 surrounding a rear opening 42, which reinforcement profile is formed here in the side panel region, as illustrated in cross-section according to FIG. 11, by an inner rear reinforcement profile 21 and an outer rear reinforcement profile 22.

The inner and outer rear reinforcement profile 21, 22 can be an integral component of corresponding inner and outer side panel elements, of which only the outer side panel element is illustrated here as side panel 20.

Figure 2:
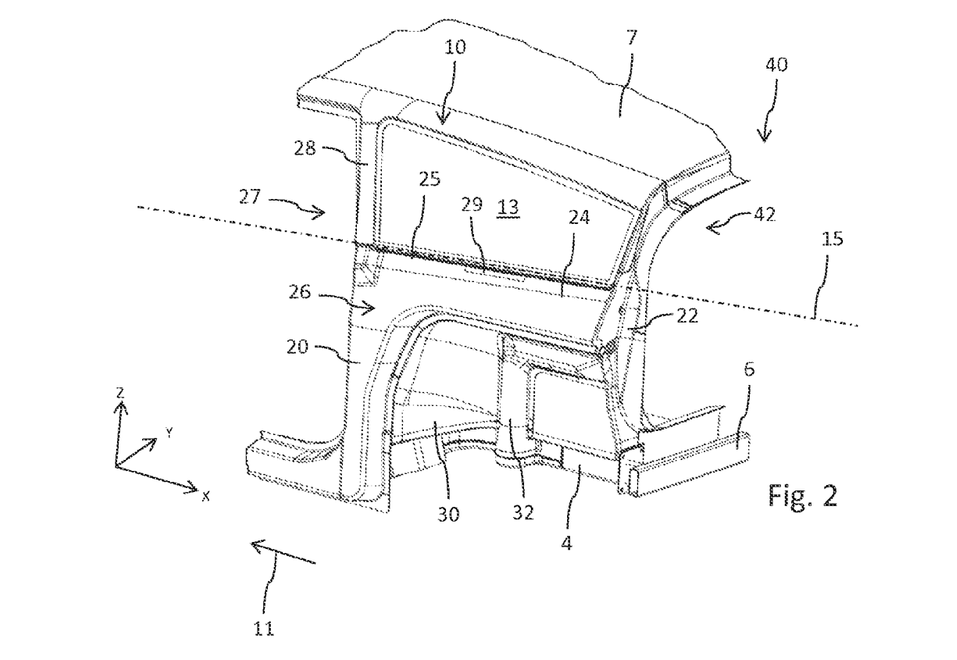
FIG. 2 is a perspective illustration of the rear end of a side panel of a motor vehicle body.

The side panel 20 shown in FIG. 2 has a window cut-out 13 above and adjoining a belt line 15 extending substantially in the longitudinal direction (y) of the vehicle. This is delimited above by a roof railing, not designated in further detail, and toward the front, i.e. in the direction of travel 11 of the motor vehicle 1, by a column profile 28 of the side panel 20, extending in the vertical direction (z) of the vehicle. In the region of the window cut-out 13 in particular a fixed rear side window is able to be arranged, for instance by adhesion. On or along the lower edge of the pane 46, shown in FIG. 10a, the outer side 27 of the side panel 20 has a support 24 which is set back with respect to the pane 46 and also with respect to the column profile 28.

Figure 9:
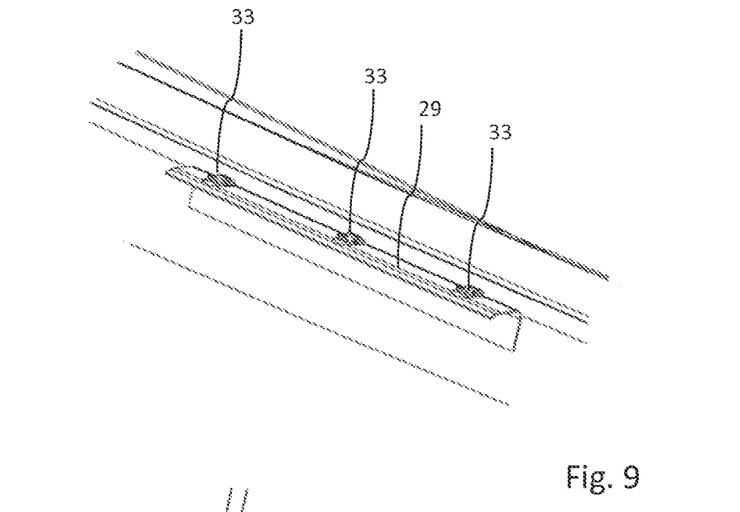
FIG. 9 is an enlarged illustration of a mount provided on the side panel of the body.
Figure 10A:
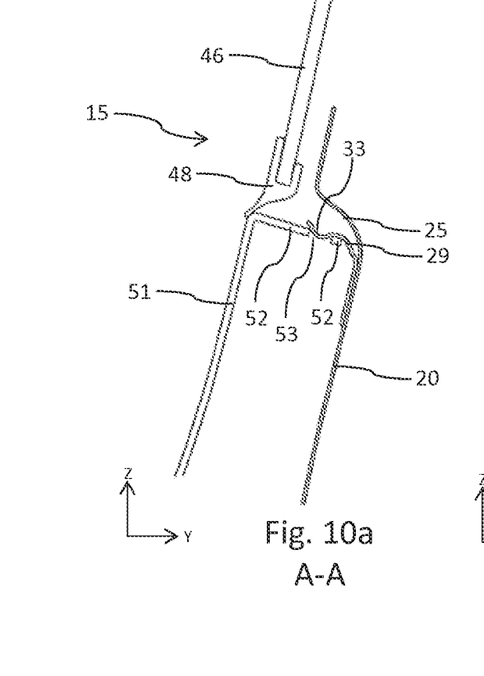
FIG. 10a is a cross-section along A-A according to FIG. 8.
Figure 10B:
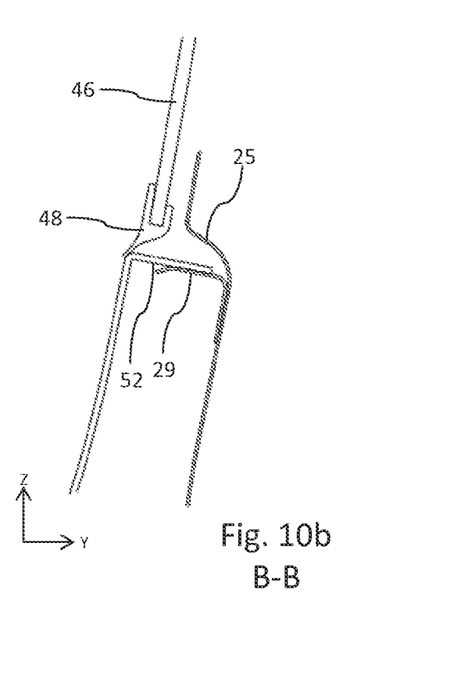
FIG. 10b is a cross-section B-B according to FIG. 8.

Upwards, i.e. facing the belt line 15 and the pane 46, the side panel 20 has an offset or shoulder 25 in the transverse direction (y) of the vehicle, as can be seen respectively from the cross-sectional illustrations of FIGS. 10a and 10b. Beneath this shoulder 25, the side panel 20 has a mount 29, projecting outwards in the transverse direction (y) of the vehicle, for a rear fender module 50. The mount 29, as further illustrated in FIG. 9, in the form of a fastening angle is provided with a downwardly projecting arm resting directly on the support 24 and with an upper arm projecting approximately at right-angles and outwards hereto. In the region of the upper arm, several spring tongues 33 are constructed, spaced apart from one another in the longitudinal direction (x) of the vehicle and extending respectively in the transverse direction (y) of the vehicle.

These spring tongues 33, typically constructed as punched-out and upwardly shaped lugs, serve for a form-fitting fastening of the rear fender module 50, as is described further below. The mount 29 and the support 24 form a connection region 26 for the rear fender module 50 illustrated in FIGS. 3 to 7. Beneath the connection region 26 or respectively beneath the support 24, which runs approximately horizontally, the side panel 20 has wheel arch 30 which is curved inwards towards the center of the vehicle. On the outer side of the wheel arch 30 shown in FIG. 2, in addition a reinforcement profile 32 is arranged, which serves here equally for reinforcing and connecting both a suspension and also a shock absorber of a wheel- or axle suspension which is not shown here.

Figure 3:
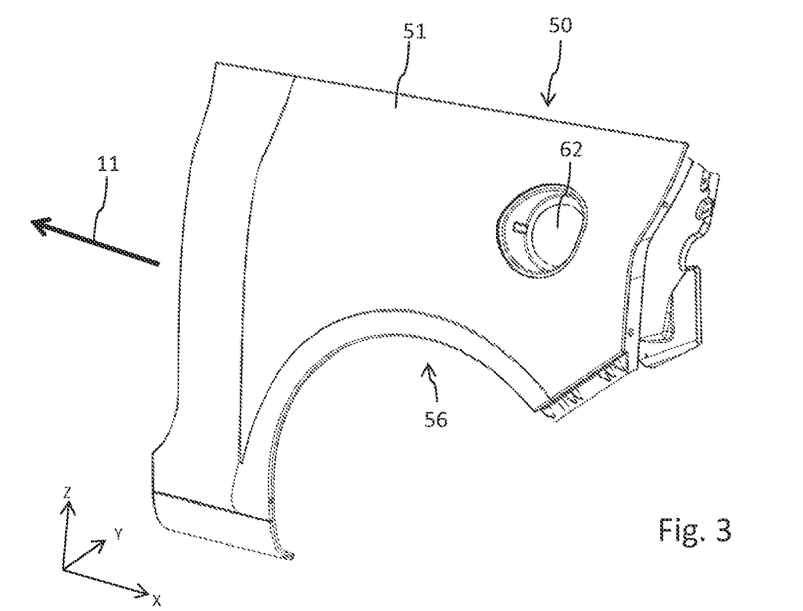
FIG. 3 is a perspective and isolated illustration of a fender module, viewed from the exterior.
Figure 4:
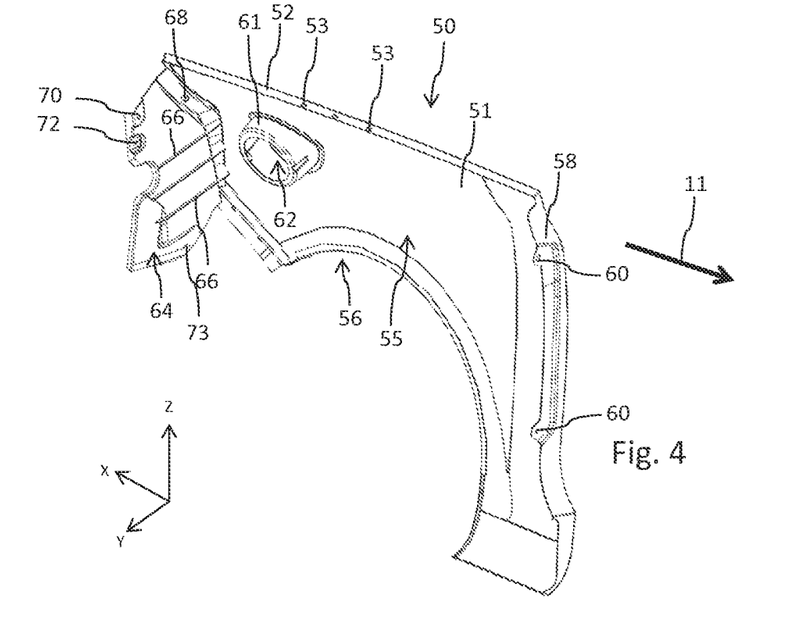
FIG. 4 is a further illustration of the fender module, viewed from the interior.

The rear fender module 50, illustrated in FIG. 3 separately and in perspective from the exterior, has a fender shell 51, visible from the exterior in the subsequent assembly, and various add-on parts 61, 80, 90, 100 arranged hereon. In addition, the fender shell 51 is provided with at least two fastening sites 53, 60, 72 for detachable fastening on the side panel 20. In practice and as illustrated in FIGS. 3 and 4, the fender shell 51 has an upper fastening edge 52, projecting inwards in the manner of a flange in the transverse direction (y) of the vehicle, with a total of three fastening sites 53, constructed here as through-openings. With this upper fastening edge 52, the fender shell 51, therefore the entire rear fender module 50, can be pushed under the spring tongues 33, illustrated in FIG. 9, of the mount 29, so that the downwardly curved sections of the spring tongues 33 come to lie in the fastening sites 53, constructed as through-openings, of the upper fastening edge 52 of the fender shell 51 and fix the latter.

As can be seen in addition from the illustration of FIGS. 10a and 10b, in accordance with this, the cover 48, to be provided on the lower pane edge, is to be arranged adjoining the rear fender shell 51. A gap necessarily resulting through the detachable fastening of the fender module 50 can therefore be covered by the cover 48 and accordingly concealed. The form-fitting connection formed by the spring tongues 33 and the fastening sites 53 on the fender module side can be suitable by simple pulling and pushing in the transverse direction (y) of the vehicle for the dismantling and re-mounting of the of the fender module 50 several times and without the aid of fastening tools.

The fender module 50 illustrated in FIGS. 3 and 4 has, in addition, on the fender shell 51 a front fastening edge 58, lying at the front in direction of travel (11), running substantially in the vertical direction (z) of the vehicle, projecting inwards in the manner of a flange, on which fastening edge at least one, here even two, further fastening sites 60 are constructed, here in the form of two lug-like extensions projecting inwards in the transverse direction (y) of the vehicle.

These fastening sites 60 have a through-opening for a threaded connection with the side panel 20. On the inner side 55 of the fender module 50, shown in FIG. 4, in addition a rear connection structure 64 is shown, projecting inwards approximately in the transverse direction (y) of the vehicle. In the present example embodiment, the rear connection structure 64 is configured as a plastic injection molded component, which is, if applicable, fiber-reinforced or provided with metal inserts.

On the inner side, facing the observer in FIG. 4, reinforcement ribs 66, running approximately horizontally, and various fastening sites 68, 70, 72, 73 are constructed on the rear connection structure 64. These fastening sites 68, 70, 72, 73 can serve either for fastening the rear connection structure 64 on the rear reinforcement profile 40, or else for the connecting of one or more add-on parts 80, 100 on the fender module 50.

Here, the fender module 50 has an add-on part 61 equipped as a fuel inlet compartment, which serves as a through-opening 62 to receive a further add-on part 90 configured as a fuel filler tube. On the inner side 55 of the fender shell 51, shown in FIG. 4, toward the bottom, on the wheel house edge 56 following the shaping of the wheel arch 30, an inwardly projecting groove 57 in FIG. 12 is constructed, wherein in the intermediate space formed by the groove 57 and the inner side of the fender shell 51, a side edge 54, configured in a corresponding manner hereto, of a further add-on part 80, configured as a fender insert, is able to be inserted.

Figure 5:
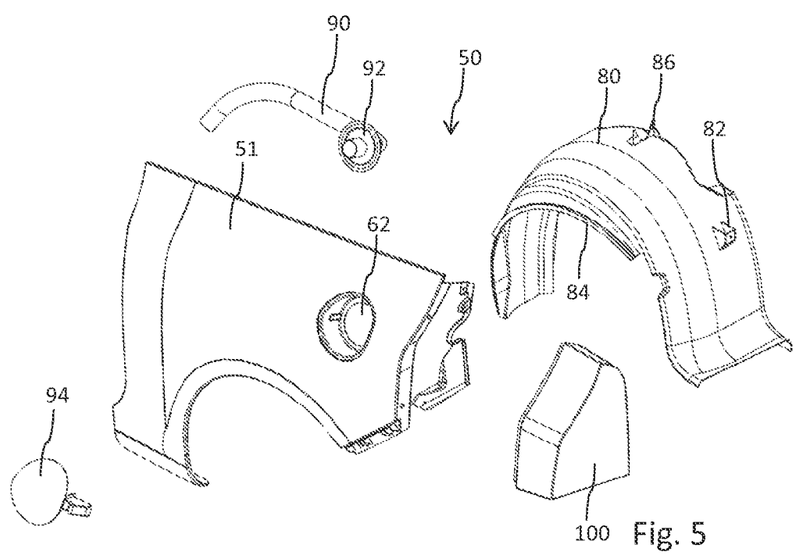
FIG. 5 is a rear fender module, equipped with various add-on components, in expanded illustration.
Figure 6:
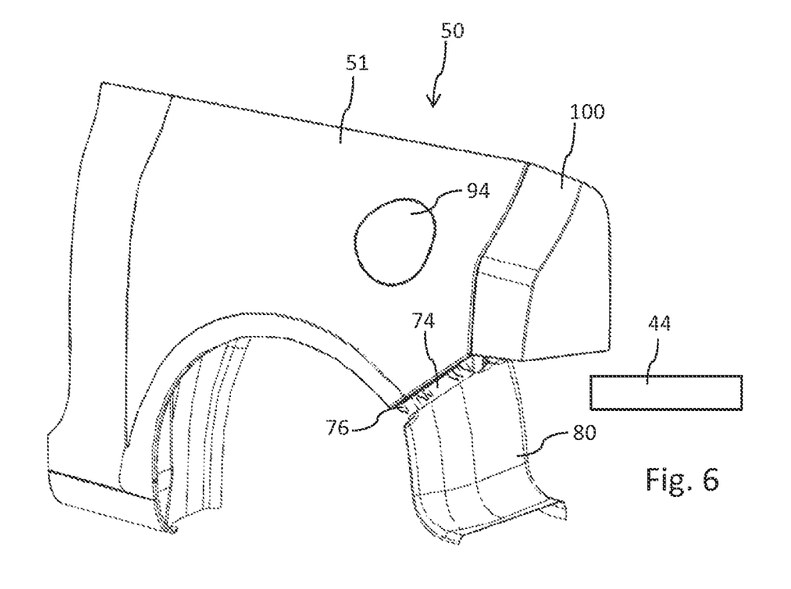
FIG. 6 is the fender module according to FIG. 5 with add-on parts arranged thereon.
Figure 13:
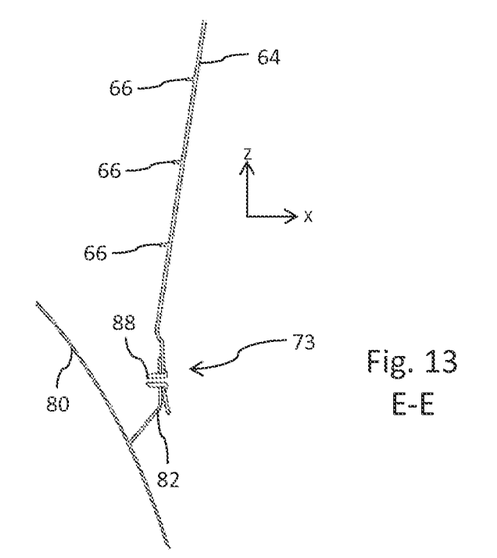
FIG. 13 is a further cross-section E-E according to FIG. 8.

The add-on part 80, typically functioning as a plastic component and as a fender insert, has a contour following the wheel envelope curve and is able to be arranged with its side edge 84, illustrated in FIG. 5, on the one hand in the inwardly and upwardly open groove 57 of the wheel house edge 56 of the fender shell 51 of the fender module 50. In addition, the add-on part 80 has toward the rear, facing the rear of the vehicle, a bracket-like fastening element 82, which comes to lie in an installation position on the fender module 50 in an overlapping manner with the fastening site 73, configured as a through-opening, of the rear connection structure 64. Using a fastening element 88, configured for example as a detent pin or expanding mandrel, the add-on part 80 can therefore be additionally connected with the lower end of the rear connection structure 64, as can be seen from the cross-section according to FIG. 13.

Figure 7:
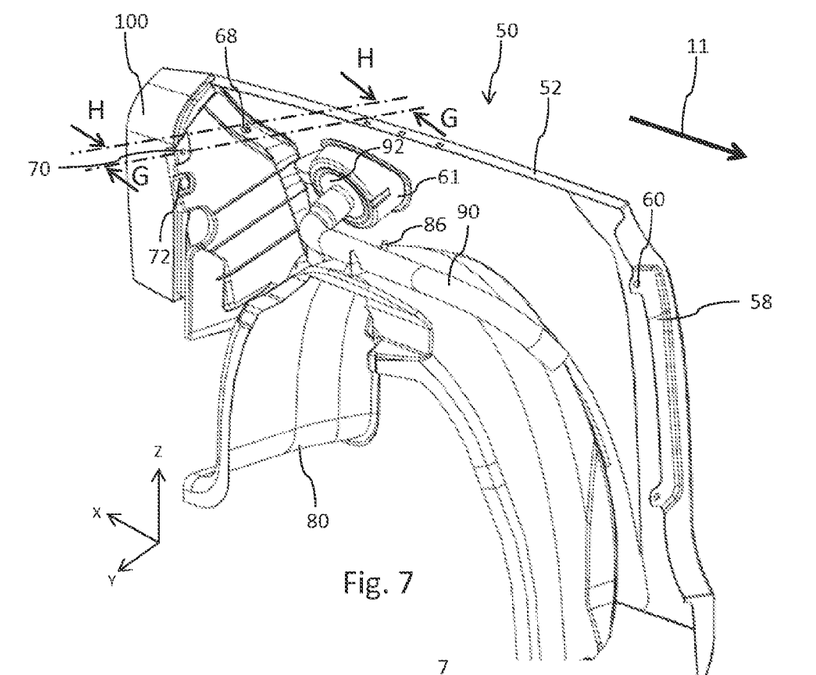
FIG. 7 is a perspective interior view of the fender module according to FIG. 6.
Figure 12:
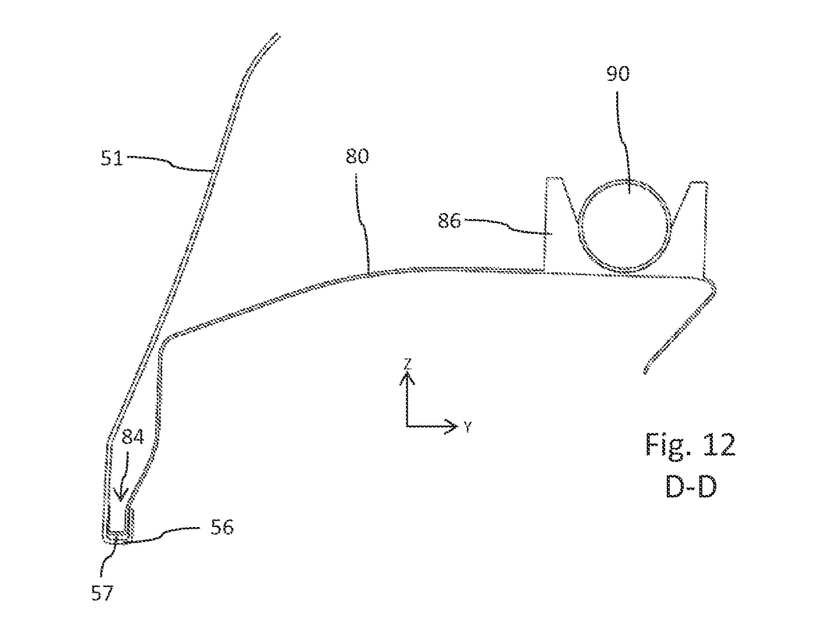
FIG. 12 is a cross-section D-D through the fender module according to FIG. 8.

As additionally illustrated in FIGS. 5, 7 and 12, the add-on part 80, configured in the manner of an arch, has in its upper apex point a fork- or clip-like fixing element 86, into which an add-on part 90, configured as a fuel filler tube 90, is able to be inserted. The add-on part 90 has, in addition, a connection piece 92 filling the interior cross-section of the through-opening 62 of the fuel inlet compartment. The connection piece 92 can, as illustrated by way of example in FIG. 14, be configured as a connection fitting of a fuel filler tube and can provide a base closing the fuel inlet compartment.

Figure 14:
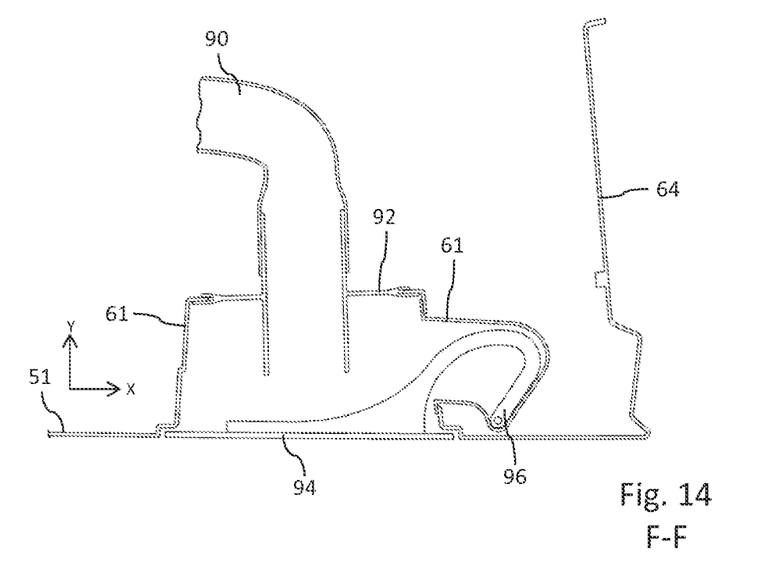
FIG. 14 is a horizontal cross-section F-F at the height of a fuel inlet compartment.

As shown in FIG. 14, in the region of the add-on part 51, configured as a fuel inlet compartment, in addition a fuel filler flap 94 is mounted pivotably via a hinge 96. On a rear end section of the fender shell 51, a mount 74, provided with detent elements 76, is also provided for a bumper lining 44 indicated only diagrammatically in FIG. 6. A bumper lining 44, equipped with corresponding counter detent elements can be connected, in particular resting in the mount 74 and in interaction with the detent elements 76 of the fender shell 51, with the fender module 50 mounted on the vehicle body 2.

Figure 8:
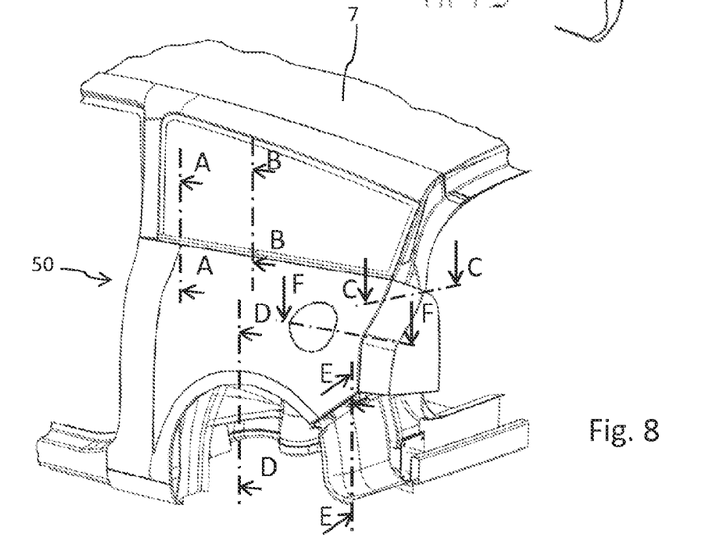
FIG. 8 is a fender module according to FIG. 7, fastened to a side panel shown in isolation in FIG. 2.

In FIGS. 5, 8 and also 14 and 15, the connection of an add-on part 100, configured as a rear light module, on the fender module 50 is illustrated. The respective add-on part 100 is arranged here approximately in alignment and adjoining on the rear side to the outer contour of the fender shell 51. It is arranged here typically on the rear connection structure 64 of the fender module 50 and fastened hereon. As illustrated in the cross-section according to FIG. 15, the add-on part 100 has a flange 104 projecting inwards in the transverse direction of the vehicle, with a through-opening 106, which can be configured here as a screw hole. On the outer side of the add-on part 100, facing the rear of the vehicle, in addition a nut 108 is arranged, mounted so as to be secure against rotation, which cooperates with a screw 110 which is able to be pushed from the inner side through the fastening site 70 of the rear connection structure 64.

Figure 15:
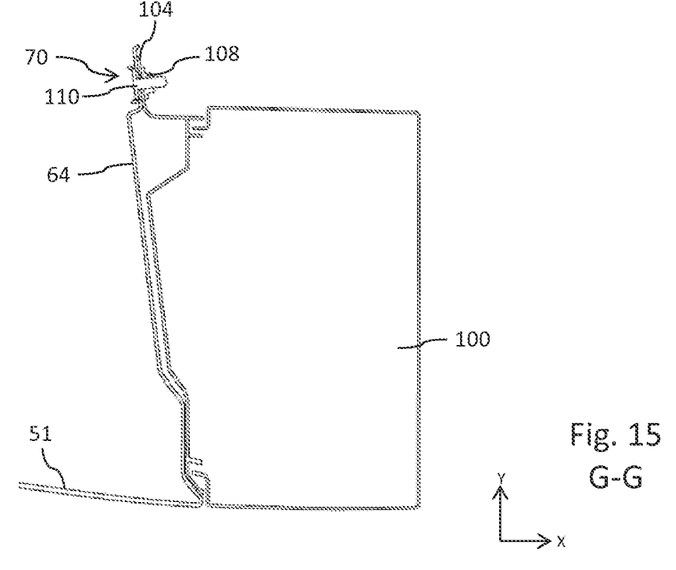
FIG. 15 is a cross-section G-G according to FIG. 7.

The threaded connection shown in FIG. 15 can also take place by means of a threaded fastener having a security against rotation. The add-on part 100, configured as a rear light module, can be fastened by means of a threaded nut on a screw or bolt which is engaging and accordingly secure against rotation. In this respect, the screw 110 is to be fastened on the rear connection structure 64 in a manner secure against rotation, whilst the nut 108 is configured so as to be rotatable, accessible from the exterior.

Figure 16:
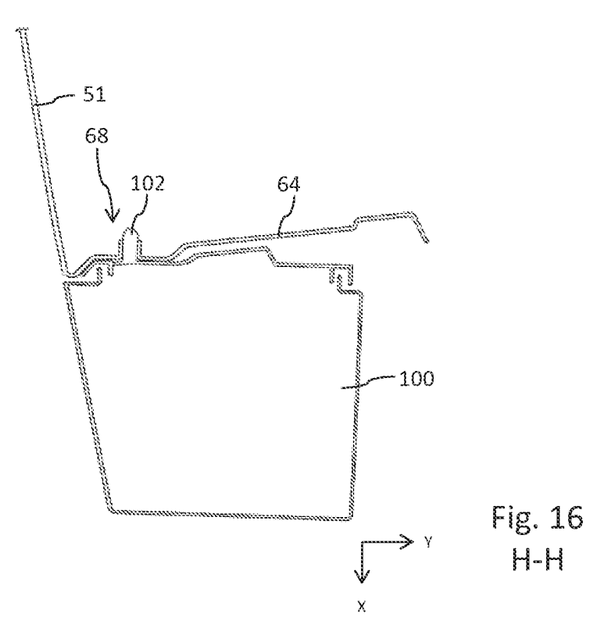
FIG. 16 is a cross-section H-H according to FIG. 7.

At a different site, shown in cross-section in FIG. 16, the rear connection structure 64 has a further fastening site 68 for the add-on part 100. This fastening site 68 has a through-opening provided with an inwardly projecting edge protrusion to receive a mounting pin 102 on the add-on part side. The mounting pin 102 can be inserted in an accurately fitting manner into the through-opening of the fastening site 68, whereby the add-on part 100 is adjusted and arranged in an accurately fitting manner in the vertical direction of the vehicle and in the transverse direction of the vehicle on the fender module 50. A certain possibility for adjustment then further exists via the tolerance-compensating fastening site 70 illustrated in enlarged form in FIG. 15.

Figure 11:
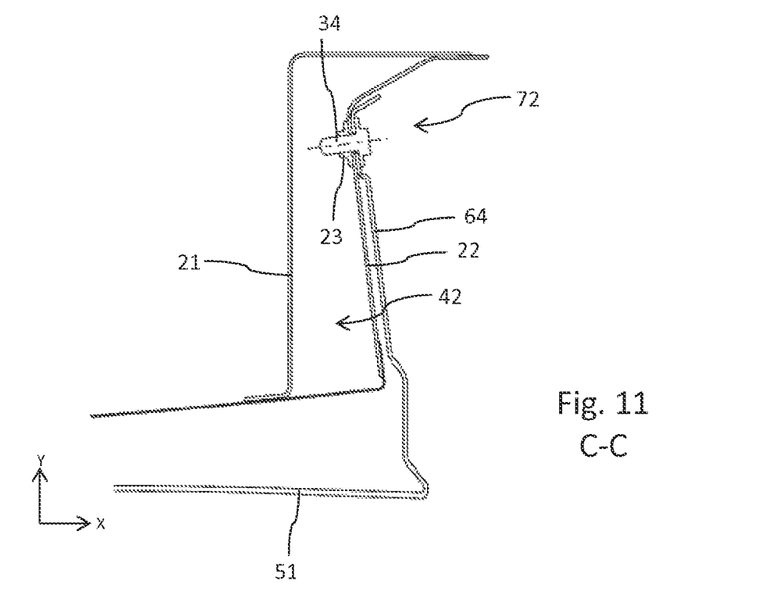
FIG. 11 is a cross-section C-C according to FIG. 8.

Outside the add-on part 100, configured as a rear light module, the rear connection structure 64 has a further fastening site 72, shown in the cross-section of FIG. 11, by means of which the rear connection structure 64 is able to be fastened by means of a threaded connection on the side panel 20, in particular on an outer rear reinforcement profile 22 of the side panel 20. The rear reinforcement profile 22 shown there has on the inner side a weld nut 43 to receive a screw 34 which is able to be screwed in from the exterior.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A rear fender module for arrangement on a side panel of a motor vehicle body comprising:
    a fender shell having at least two fastening sites for detachable fastening on the side panel; and
    at least one add-on part arranged on the fender shell,
    wherein the fender shell further comprises a rear connection structure on a rear end section of the fender shell that projects inwards in a transverse direction of the vehicle, the transverse direction of the vehicle substantially perpendicular to a longitudinal direction of the vehicle, and the rear connection structure having:
    a first fastening site configured to detachably fasten the rear fender module to a rear reinforcement profile of the motor vehicle body; and
    a second fastening site configured to fasten the at least one add-on part to the rear fender module, and the at least one add-on part includes a rear light module.

2. The rear fender module according to claim 1, wherein the fender shell further comprises an upper fastening edge running in a longitudinal direction of the vehicle in relation to an installation position in the motor vehicle, the upper fastening edge projecting in the manner of a flange inwards in a transverse direction of the vehicle, with at least one fastening site formed thereon.

3. The rear fender module according to claim 1, wherein the rear light module is arranged on the rear connection structure.

4. The rear fender module according to claim 1, further comprising a mount formed on a lower edge of the rear connection structure and having at least one detent element configured to mount a bumper lining.

5. The rear fender module according to claim 1 wherein at least one of the fender shell and the rear connection structure is constructed as a plastic component.

6. The rear fender module according to claim 1 wherein at least one of the fender shell and the rear connection structure is constructed as a light metal sheet component.

7. The rear fender module according to claim 1, wherein the fender shell further comprises a front fastening edge on a front end section of the fender shell, the front fastening edge running in a vertical direction of the vehicle and forming a flange projecting inwards in the transverse direction of the vehicle with at least one fastening site.

8. The rear fender module according to claim 1, wherein the add-on part comprises a fender insert, wherein the fender shell has a wheel house edge running in the manner of an arch on an inner side thereof configured to receive the fender insert.

9. The rear fender module according to claim 8, wherein the fender insert is configured in the form of a wheel envelope curve and arranged with a side edge in a groove projecting inwards in a transverse direction of the vehicle on the wheel house edge of the fender shell.

10. The rear fender module according to claim 8, wherein the fender insert comprises at least one fastening element facing a rear connection structure formed on the fender insert and configured to connect with the rear connection structure.

11. The rear fender module according to claim 1, wherein the add-on part comprises a fuel filler tube arranged in a fuel inlet compartment integrated into the fender shell.

12. The rear fender module according to claim 11 wherein the fuel filler tube is fixed by means of a fixing element arranged on a fender insert.

13. A motor vehicle comprising at least one fender module according to claim 1.

14. A motor vehicle body comprising:
a side panel; and
a rear fender module including a fender shell having at least two fastening sites detachably fastened on the side panel and at least one add-on part arranged on the fender shell,
wherein the fender shell further comprises a rear connection structure on a rear end section of the fender shell that projects inwards in a transverse direction of the vehicle, the transverse direction of the vehicle substantially perpendicular to a longitudinal direction of the vehicle, and the rear connection structure having:
a first fastening site configured to detachably fasten the rear fender module to a rear reinforcement profile of the motor vehicle body; and
a second fastening site configured to fasten the at least one add-on part to the rear fender module, and the at least one add-on part includes a rear light module.

15. The motor vehicle body according to claim 14, wherein the side panel comprise a mount projecting outwards in the transverse direction of the vehicle adjoining a belt line running substantially in the longitudinal direction of the vehicle, the mount providing a form-fitting and detachable connection with an upper fastening edge of the fender shell.

\* \* \* \* \*